Figure 1:
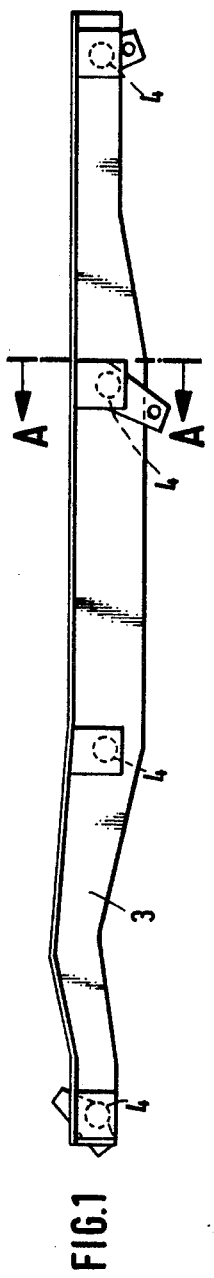

United States Patent [19]

Lehr

[11] 4,093,253
[45] June 6, 1978

[54] CHASSIS FRAME FOR MOTOR VEHICLES

[75] Inventor: Josef Lehr, Hannover, Germany

[73] Assignee: Daimler-Benz Aktiengesellschaft, Stuttgart, Germany

[21] Appl. No.: 748,307

[22] Filed: Dec. 7, 1976

[30] Foreign Application Priority Data

Dec. 8, 1975 Germany .............................. 2555107

[51] Int. Cl.² ............................................. B62D 21/02
[52] U.S. Cl. .................................. 280/789; 296/28 R
[58] Field of Search ....................... 280/106 R, 106 T; 296/28 R

[56] References Cited

U.S. PATENT DOCUMENTS

| | | | |
|---|---|---|---|
| 2,646,285 | 7/1953 | Snyder | 280/106 |
| 2,700,551 | 1/1955 | Stump | 280/106 |
| 2,791,439 | 5/1957 | Swanson | 280/106 |

Primary Examiner—Philip Goodman
Attorney, Agent, or Firm—Max Fogiel

[57] ABSTRACT

A chassis frame for motor vehicles in which cross members projecting from sides of the frame interconnect longitudinal members in the form of hollow girders. The longitudinal members have openings in their side walls, and these openings conform with the cross-section of the cross members. The cross members have a center section and abutting end sections inserted from the sides through the openings into the hollow interior of the longitudinal girders. The cross members pass through the longitudinal members so that the end sections project beyond these longitudinal members. The center section of the cross members penetrate the wall of the longitudinal members facing the vehicle center. The center section and the end sections abut each other bluntly and are connected to each other by welds within the interior of the hollow section of the longitudinal members. The end sections of the cross members, furthermore, pass through the outer wall of the longitudinal members.

9 Claims, 5 Drawing Figures

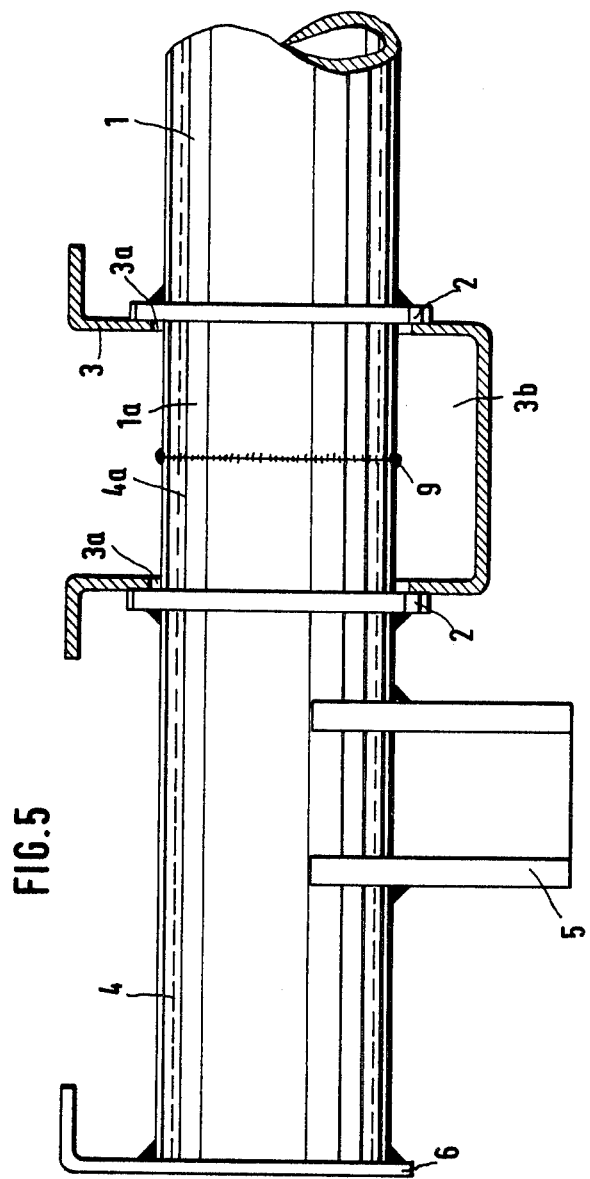

CHASSIS FRAME FOR MOTOR VEHICLES

The invention relates to a chassis frame for motor vehicles comprising parallel longitudinal members in the form of hollow section girders interconnected by cross members projecting from the sides of the frame.

In the construction of chassis frames which have the general shape of a ladder, the manner in which the cross members are joined to the longitudinal members is a matter of major importance. Generally the cross members are fitted between the longitudinal members and parts needed on the outside of the longitudinal members are attached to them separately. Considerations of space usually prevent the cross members from being arranged to cross over or under the longitudinal members. If the cross members are to penetrate the longitudinal members by passing through a hole, then this requires that the cross members are substantially straight. In such a case it is also a very considerable drawback that nearly all the fittings, such as the brackets for springs, supporting brackets, holders and so forth must be attached to the cross members after they have themselves been assembled in the frame. The many welds that are necessary result in considerable distortion which must then be rectified by straightening operations. This applies particularly to chassis frames of light metal construction.

It is therefore an object of the present invention to provide a simple arrangement for joining the longitudinal and the cross members together in a manner that is easily and quickly accomplished with satisfactory static results, and with the avoidance of distortion due to welding when the frames are of light metal construction.

According to the invention this is achieved by providing the longitudinal members in their side walls which enclose the hollow interior of the section with openings conforming with the cross section of the cross members, and with an open top or bottom where these openings are situated, by employing cross members which are composed of a centre section which at each end abuts an end section, and by inserting said sections from the sides through the openings into the hollow interior of the longitudinal members where the abutting sections are welded together.

Preferably the cross members penetrate the hollow longitudinal sections in the middle and the cross member sections are joined by welding in the middle of the hollow interior. Preferably the weld is a fusion butt weld.

According to another feature of the invention the ends of the centre and end sections of the cross members are secured externally to the side walls of the hollow longitudinal sections by spot welds or rivets. The cross member sections may be assembly parts already provided with all fittings, such as brackets for springs, mounting brackets, steering brackets, holders and so forth.

The advantages afforded by a chassis frame of the proposed kind reside in that it can be of light metal construction and that its load bearing ability is good. The transmission of forces from the thin sheet metal of the pressed longitudinal member, for instance to a spring bracket can be readily controlled through the cross sections of the fixing flange to the tubular cross member. The two weld joints which are suitable for large scale production, i.e. the spot welds and the fusion butt weld do not call for a considerable amount of skill. No subsequent work to correct weld distortion is needed. The fusion weld seam is secreted inside the hollow section and need not be specially deburred.

The proposed construction of the chassis frame would also permit the spot welds to be replaced by rivets and the fusion weld by a conventional $CO_2$-weld.

The proposed chassis frame is naturally also suitable for the construction of trailers and for the frames of tipping bodies. Moreover, the cross members in the proposed frame need not be straight.

Figure 2:
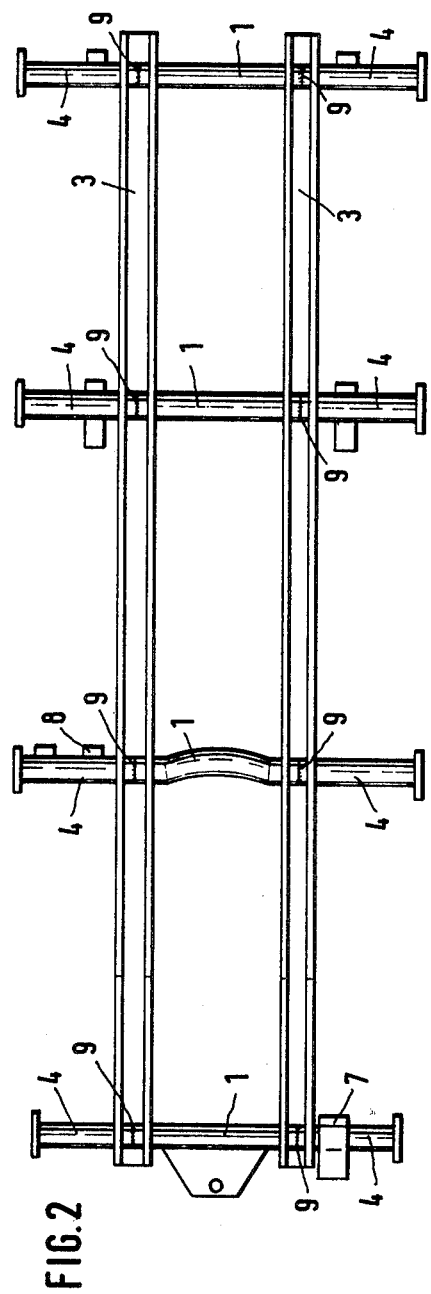
Figure 3:
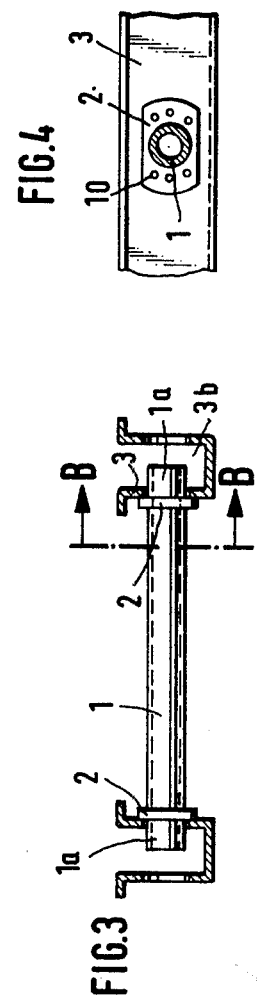
Figure 4:
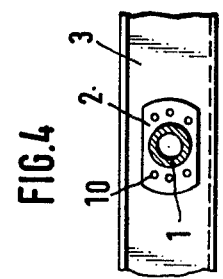

An embodiment of the invention which can be performed in a variety of different ways will now be more particularly and illustratively described with reference to the accompanying drawing in which FIG. 1 is a side view of a chassis frame according to the invention, FIG. 2 is a view of the chassis frame from above, FIG. 3 is a section taken on the line A—A in FIG. 1, FIG. 4 is a section taken on the line B—B in FIG. 3, and FIG. 5 is a part section taken on the line A—A in FIG. 1, on a larger scale.

The illustrated chassis frame substantially comprises two longitudinal members 3 and several cross members 1, 4. In the illustrated embodiment each longitudinal member 3 is an upwardly open channel section with angle-edged flanges. For assembly with the cross members 1, 4 the hollow section of the longitudinal members 3 must be upwardly or downwardly open, at least where the cross members 1, 4 are to be located, to provide access for welding and for an inspection of the weld.

The cross members 1, 4 comprise a centre section 1 and two end sections 4. The flanges of the longitudinal sections 3 contain openings 3a through which in a first assembly stage the free ends 1a of the centre sections 1 of the cross members are inserted so that their ends are in the middle of the hollow interior 3b enclosed by the section flanges. The centre sections 1 are provided with fixing collars or plates 2 which are secured to the outside of channel section flanges by spot welds 10 or by rivets. The centre section 1 may be straight or curved and it may be provided with fittings such as lugs, brackets and so forth.

In a second assembly stage the ends 4a of the end sections 4 of the cross members, already fitted with brackets 5 for springs, brackets 6 or 7 for bearings and so forth or holders 8, are inserted from the outside through the openings 3a in the longitudinal members 3 and connected to the abutting ends 1a of the centre section 1 preferably by a fusion butt weld 9.

The end sections 4 of the cross members are also provided with fixing plates 2 which are secured externally to the flanges of the longitudinal member 3.

This completes the basic construction of the chassis frame. In the case of an integral body frame, i.e. a box frame structure, the hollow sections of the longitudinal members and the bracket holders are interconnected by a common floor panel to form an integrated assembly, whereas in other types of body (platforms) only the longitudinal members are closed by a cover section.

The longitudinal members may also consist of two connected channel sections or two H-sections enclosing a cavity which is upwardly or downwardly open at the junction with the cross members. In principle according to the invention, any hollow section beams or beams capable of being joined together to form a hollow section are intended to be connected to cross members in the manner that has been described.

I claim:

1. A chassis frame for motor vehicles comprising parallel longitudinal members in form of hollow section girders; cross members projecting from the sides of the frame and interconnecting said longitudinal members; said longitudinal members having openings in their side walls enclosing the hollow section; said openings conforming with the cross section of the cross members, said cross members having a center section and abutting end sections, said sections being inserted from the sides through the openings into the hollow interior of the longitudianl section; said cross members passing through said longitudinal members, said end sections projecting beyond the longitudinal members, said center section of said cross members penetrating the wall of the longitudinal members facing the vehicle center, said end sections of said cross members passing through the outer wall of the longitudinal members, said center section and said end sections abutting bluntly each other and being connected to each other by welds within the interior of the hollow section of said longitudinal members.

2. A chassis frame as defined in claim 1, wherein said cross member sections penetrate the hollow section of said longitudinal members in the middle.

3. A chassis frame as defined in claim 1, wherein said cross member sections abut in the middle of the hollow interior of said longitudinal members.

4. A chassis frame as defined in claim 3 wherein the joint between sections of said cross members is formed by a fusion butt weld.

5. A chassis frame as defined in claim 1, including fixing plates on the ends of said center section and said end sections of said cross members.

6. A chassis frame as defined in claim 5, wherein said fixing plate of said center section and said end sections of said cross members are connected externally to side walls of the hollow sections by spot welds or rivets.

7. A chassis frame as defined in claim 1, wherein the cross member sections are assembly components having fittings including elements such as brackets for springs, mounting brackets, steering brackets, and holders.

8. A chassis frame as defined in claim 1 wherein said hollow sections of said longitudinal members are comprised of two sections selected from the group of two interconnected channel sections, H-sections, angle sections and Z-sections.

9. A chassis frame for motor vehicles as defined in claim 1, wherein the cross member sections penetrate said hollow sections of said longitudinal members in the middle, the sections of said cross members abutting in the middle of the hollow interior of said longitudinal members, the joint between sections of the cross members being formed by a fusion butt weld; fixing plates on the ends of said center section and said end sections of said cross members, said fixing plates of said center section and said end sections being connected externally to side walls of the hollow sections, said cross member sections being assembly components having fitting elements, said hollow sections of said longitudinal members being comprised of two interconnected channel sections, each longitudinal member having an upwardly open channel section with angle-edged flanges, said hollow sections of said longitudinal members being interconnected by a common floor panel to form an integrated assembly.

* * * * *